United States Patent [19]  
Harrod

[11] 4,206,907  
[45] Jun. 10, 1980

[54] SUSPENSION STRUT WITH PNEUMATIC SPRING
[75] Inventor: Edward L. Harrod, Dayton, Ohio
[73] Assignee: General Motors Corporation, Detroit, Mich.
[21] Appl. No.: 912,551
[22] Filed: Mar. 5, 1978
[51] Int. Cl.² ............................................... F16F 9/04
[52] U.S. Cl. ..................................... 267/8 R; 267/64 B
[58] Field of Search .................. 267/8 R, 64 R, 64 B, 267/65 R, 65 B, 65 D

[56] References Cited
U.S. PATENT DOCUMENTS

| 3,000,624 | 9/1961 | Cislo | 267/65 B |
| 3,000,625 | 9/1961 | Polhemus | 267/64 B |
| 3,121,562 | 2/1964 | Long | 267/64 B |
| 3,372,919 | 3/1968 | Jackson | 267/65 B |
| 3,954,257 | 5/1976 | Keijzer et al. | 267/64 R |

FOREIGN PATENT DOCUMENTS 1157493  11/1963  Fed. Rep. of Germany ......... 267/64 B  
830283   3/1960  United Kingdom .................... 267/65 B

OTHER PUBLICATIONS

*Goodyear Super-Cushion Air Springs,* "GYRL-300", GYRL-400, Jul. 1971, pp. 15, 16.

Primary Examiner—Edward R. Kazenske  
Attorney, Agent, or Firm—Charles R. White

[57] ABSTRACT

MacPherson-type strut in combination with a rolling lobe air spring assembly for vehicle suspension. This air spring assembly comprises a tubular rubber boot fixed at its upper end to a retainer cap removably mounted on the strut piston rod. The lower end of the boot is fixed to a retainer sleeve which is removably mounted on the reservoir tube of the strut. The outer periphery of the retainer sleeve is profiled to present a variable diameter surface for the air spring and cooperates therewith to provide a variable rate spring. This air spring assembly may be easily replaced by another assembly for service or for changing the spring rate of the suspension.

2 Claims, 3 Drawing Figures

U.S. Patent  Jun. 10, 1980  4,206,907
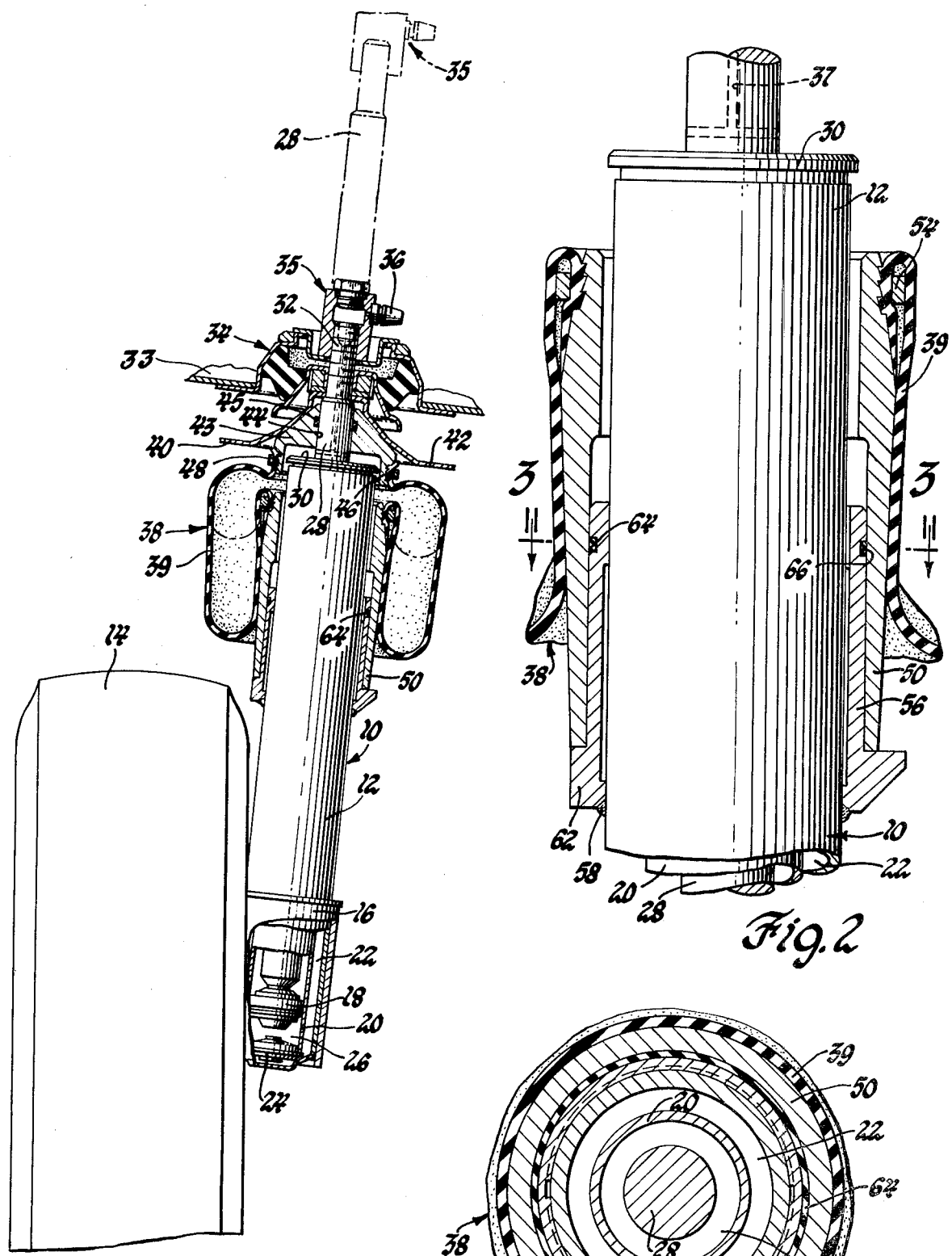

SUSPENSION STRUT WITH PNEUMATIC SPRING

This invention relates to vehicle suspensions and more particularly to a new and improved suspension strut and air spring.

Prior to the present invention, various suspension strut designs have been provided which incorporate air springs that utilize the elasticity of the confined air within a rubber boot as the energy medium to yieldably support a load. The spring action is a result of the compression and expansion of the confined air within the boot. Such air springs are particularly noted for their ability to easily vary load capacities by changing only the air pressure within the boot. Of the many types of air springs, the rolling lobe type has emerged as one of the most versatile and dependable air spring. It is compact and self-contained and can be readily designed with load deflection and rate curves tailored to meet a wide range of specific requirements.

In the present invention, a rolling lobe air spring is used in combination with a MacPherson-type strut to provide a suspension member for a wheeled vehicle. In this invention, the rolling lobe air spring is comprised of a flexible boot member of rubber or rubber-like material which is secured to a boot end cap that is slidably mounted on the piston rod of a shock absorber cartridge of the suspension strut. The lower end of the rubber boot is secured to a cylindrical retainer sleeve cap which is mounted on a sleeve support that is welded or otherwise fixed to the reservoir of the strut. The outer periphery of the retainer sleeve is engaged by the rolling lobe of the air spring and is profiled so that the spring rate of the air spring is tailored to suit varying requirements. With this invention, the air spring assembly can be readily removed from the suspension strut and replaced by a new air spring assembly to facilitate repair or to provide an air spring with different spring rate characteristics.

It is a feature, object and advantage of this invention to provide a new and improved suspension strut and rolling lobe air spring in which the spring has an upper retainer cap removably mounted on a piston rod of the suspension strut and a lower retainer sleeve which is removably mounted on the exterior of the suspension strut.

It is another feature, object and advantage of this invention to provide a new and improved vehicular suspension strut and air spring assembly in which the air spring is removably mounted on the suspension strut to facilitate replacement for service or for changing the suspension characteristics of the vehicle.

These and other features, objects and advantages of this invention will become apparent from the following detailed drawings in which:

FIG. 1 is a front elevational view partly broken away of a suspension strut incorporating the principles of the present invention;

FIG. 2 is an enlarged view of a portion of the suspension strut of FIG. 1 illustrating the bottom end boot cap of the present invention; and FIG. 3 is a sectional view taken generally across lines 3—3 of FIG. 2.

Referring now to the drawings, FIG. 1 shows an independent suspension strut 10 having an outer cylindrical reservoir tube 12 which at its lower end supports road wheel 14, an unsprung mass, by conventional wheel-spindle and bracket assembly 16. Secured within the reservoir tube is a hydraulic shock absorbing cartridge incorporating a piston 18 mounted for reciprocating sliding movement in a cylinder tube 20 spaced radially inwardly from the reservoir tube 12 to provide a reservoir 22 for the hydraulic damping fluid of this strut. A base valve 24 provides for hydraulic communication between the reservoir and the variable volume compression chamber 26 formed by the reciprocating piston and the cylinder tube. This piston is connected to the lower end of a cylindrical piston rod 28 which extends axially and upwardly through an end cap 30 fastened to the upper end of the reservoir tube. The piston rod 28 has an upper end 32 secured to a strut mounting assembly 34 by an adapter and air fitting assembly 35 threaded onto the upper end of the piston rod. The strut mounting assembly 34 is secured to body work 33 or other sprung mass of the vehicle by any suitable fastening means, not shown. The air fitting 36 of assembly 35 pneumatically communicates with an air passage 37 in the piston rod so that pressurized air can be supplied to or exhausted from the interior of a rolling lobe air spring 38 formed from a cylindrical boot 39 of rubber or rubber-like material that will be further described below.

Secured to the piston rod 28 immediately below the strut mounting assembly 34, is a conical air spring stop 40 formed with an annular flange 42 that is adapted to contact the upper extremity of the air spring to prevent its engagement with the strut mounting assembly 34. Mounted on the piston rod immediately below the air spring stop 40 and maintained in position by the air pressure in the air spring is an end retainer cap 43 for the air spring 38. Cap 43 is generally in the form of a truncated cone and has a central passage 44 through which the piston rod extends. An O-ring seal 45 mounted in an internal groove coaxial with passage 44 sealingly contacts the piston rod 28 to prevent leakage of air through the end retainer cap from air spring 38. Cap 43 has a downwardly-extending annular peripheral rim 46 formed with a series of annular external ridges. The upper portion of the air spring boot 39 is stretched or closely fitted around rim 46. A metallic retainer ring 48 disposed outwardly of the rim 46 is constricted to force the material of the air spring boot into the teeth formed by the ridges to provide a pneumatic seal for the upper end of the air spring. The air spring boot extends coaxially of the strut 10 and is reversely curved inwardly so that a rolling lobe is formed. From the rolling lobe, the boot extends upwardly contacting the outer periphery of an end retainer sleeve 50 to the top thereof. The terminal end of the boot is fixed to the top of the sleeve 50 by an annular clamping ring 54. As with upper ring 48, clamping ring 54 is constricted to force the material of the air spring boot into the teeth provided by annular ridges formed in the retainer sleeve 50, as best shown in FIG. 2, to provide an air tight connection. The retainer sleeve 50 is an elongated clyindrical member that slidably fits downwardly over the upper portion of the strut and onto a tubular retainer sleeve support 56 secured to the reservoir tube 12 by an annular, air-tight weld 58. The tubular sleeve support 56 has a lower radial flange 62 on the bottom end on which the retainer sleeve 50 seats. An O-ring 64 in an annular groove 66 formed in the periphery of the tubular sleeve support 56 contacts the inner wall of retainer sleeve 50 to prevent leakage from the air spring between the sleeve 56 and support 62. The retainer sleeve 50 is formed with a profiled outer surface to provide a varying diameter from the upper to the lower extremity of the sleeve. By this mechanism, the rate of the rolling lobe air spring can be selected, varied and tailored to meet suspension requirements.

The rolling lobe air spring accordingly yieldably supports the vehicle body and cooperates with the shock absorber cartridge in strut 10 to provide a smooth and comfortable ride and to improve vehicle handling characteristics. In addition, air can be selectively supplied or exhausted from the spring 38 to adjust vehicle height for vehicle leveling purposes providing for improved headlamp aiming and maintenance of the bumpers at a given height. In this regard, the phantom line position of the piston rod and rolling lobe in FIG. 1 shows these components in their extended position.

In the event that the air spring requires replacement, the piston rod is disconnected from the mounting assembly 34 and the air spring assembly comprising end cap 43, boot 39 and end retainer sleeve can be readily removed as a unit from strut 10 by axially separating the air spring assembly from the strut. After such removal, a new air spring unit may be installed by slipping the end retainer sleeve onto the tubular sleeve support and the piston rod of the strut into the end retaining cap. With this interchangeability of air spring units, units having a boot retainer sleeve with a profile different from that of FIGS. 1 and 2 can be substituted for original air spring units to change the spring rate characteristics of the suspension.

While a preferred embodiment has been shown and described for purposes of illustrating this invention, other embodiments employing the concepts and ideas of this invention may be adopted by those skilled in the art such as falls within the scope of the appended claims.

What is claimed is:

1. An air spring and suspension strut assembly for a vehicle having sprung and unsprung masses comprising a tubular housing, a shock absorber cartridge with a piston and cylinder assembly mounted in said housing, a piston rod operatively connected to said piston and extending axially from said housing, first means securing said pitton rod to one of said masses and second means securing said housing to the other of said masses, a flexible boot having a variable volume pneumatic chamber providing a suspension spring extending around an upper portion of said housing, said boot comprising radially spaced inner and outer parts interconnected by a reversibly folding rolling lobe integral therewith, said outer part having an upper end removably connected to said piston rod, a tubular support sleeve mounted on said tubular housing, clamping means tightly connecting one end of said inner part of said boot to said support sleeve to prevent the escape of air from therebetween and to firmly secure said boot to said support sleeve, said rolling part being radially spaced from the outer surface of said housing and in peripheral contact with the outer surface of said sleeve in a plurality of said position of said piston rod, said outer part of said boot forming the outer circumference of said assembly, a fluid passage means for selectively communicating pressurized fluid to and from said pneumatic chamber, a tubular mounting means secured to said tubular housing and telescopically receiving said support sleeve in a slidable slip-fit procedure axially of said tubular housing for mounting said support sleeve to said tubular housing to facilitate simultaneous linear installation and simultaneous linear removal of said boot and said support sleeve with respect to said tubular housing of said strut and annular pneumatic sealing means interposed between said mounting means and said support sleeve to block the escape of air from therebetween.

2. An air spring and suspension strut assembly for a vehicle having sprung and unsprung masses comprising a tubular housing, a shock absorber cartridge with a piston and cylinder assembly mounted in said housing, an elongated rod operatively connected to said piston and extending axially from said housing, first attachment means securing said piston rod to one of said masses, second attachment means securing said housing to the other of said masses, a flexible boot having a variable volume pneumatic chamber providing a suspension spring extending around an upper portion of said housing and forming the outer circumference of said assembly, said boot comprising radially spaced inner and outer parts interconnected by a rolling lobe integral therewith, said outer part being removably connected to said piston rod, a tubular support sleeve, clamping means tightly connecting one end of said inner part of said boot to said support sleeve in an air tight manner and to secure said boot to said support sleeve, a tubular mounting means secured to said tubular housing and telescopically receiving said support sleeve in a slidable slip-fit procedure axially of said tubular housing for mounting said support sleeve on said tubular housing to facilitate the linear installation and removal of said sleeve and said boot as a unit with respect to said housing, annular pneumatic sealing means between said mounting means and said support sleeve to block the escape of air from said chamber, said rolling part being radially spaced from the outer surface of said tubular housing and in direct contact with the exterior of said sleeve in a plurality of said positions of said piston rod, and fluid passage means for selectively transmitting pressurized gas to and from said chamber to effect the expansion and contraction thereof and thereby the height between the sprung and unsprung masses of the vehicle.

* * * * *